D. F. COMSTOCK.
METHOD OF AND APPARATUS FOR NEUTRALIZING DISTORTIONS OF OPTICAL PROJECTIONS.
APPLICATION FILED JUNE 21, 1915.

1,272,623.

Patented July 16, 1918.

Inventor:
Daniel F. Comstock,
by Roberts, Roberts & Cushby
Attys.

UNITED STATES PATENT OFFICE.

DANIEL F. COMSTOCK, OF BROOKLINE, MASSACHUSETTS, ASSIGNOR, BY MESNE ASSIGNMENTS, TO TECHNICOLOR MOTION PICTURE CORPORATION, OF BOSTON, MASSACHUSETTS, A CORPORATION OF MAINE.

METHOD OF AND APPARATUS FOR NEUTRALIZING DISTORTIONS OF OPTICAL PROJECTIONS.

1,272,623.  Specification of Letters Patent.  Patented July 16, 1918.

Application filed June 21, 1915. Serial No. 35,196.

*To all whom it may concern:*

Be it known that I, DANIEL F. COMSTOCK, a citizen of the United States, and resident of Brookline, in the county of Norfolk and State of Massachusetts, have invented new and useful Improvements in Methods of and Apparatus for Neutralizing Distortions of Optical Projections, of which the following is a specification.

This invention relates to the method of and apparatus for compensating certain distortions encountered in optical projection, and more particularly to the method of and apparatus for compensating the distortion of the projected image from an optical lantern due to the fact that the central or average ray from the optical lantern is not normal to the screen.

In the art of optically projecting upon a screen a magnified image of the photograph or other transparency, it has become the custom to place the optical lantern above the level of the point upon the screen which coincides with the middle of the picture, in order that the lantern may occupy less valuable space in the theater or hall than the point immediately opposite the screen which is usually required for seating purposes.

It is also customary to place the screen in an upright position substantially perpendicular to the normal line of vision to the average spectator. The resulting obliquity of incidence of the projection beam produces a distortion effect on the screen known as the "keystone" effect, so-called because a rectangular figure at the object or transparency is distorted in the projected image to a figure resembling an inverted keystone. This keystone effect is due to the fact that all parts of the screen where it intersects the rays are not equidistant from the projection lens, in other words, that the central ray is not normal to the screen; and since the rays of the beam leaving the projector diverge from the projector, the image on those parts of the screen more remote from the projector will be magnified to a greater extent than those parts nearer the projector. Moreover, the sharpness of definition also suffers from this obliquity as will be pointed out later.

It is the object of this invention to provide a method and means by which the keystone and other distortion may be counteracted without substantially impairing the definition. In the ordinary practice the transparency to be projected upon the screen is placed perpendicular to the optical axis of the projecting lens, and a little farther away from the lens than its principal focus, and the light from an electric arc or other illuminant is passed through the transparency and the lens. Under these circumstances, assuming for a moment a perfect lens, an ideal or mathematical image is produced in space in a plane perpendicular to the optical axis of the lens and a considerable distance in front of the lens. If a screen is placed so as to coincide with this image plane, a perfect, enlarged image geometrically similar to the transparency itself will be formed on the screen.

Strictly speaking, there is no other point in space where a true image is formed, and if the screen is placed at any other position along the optical axis, or if the angle it makes with the optical axis is changed by the slightest amount, that is, if the screen is tipped, there will appear no true image on the screen, that is, such pseudo image as there is, will be indistinct, and will lack what is technically called "definition".

Practically, however, the case is somewhat different, since no lenses are perfect and since the eyes of the spectators are at considerable distances from the screen, and it is therefore impossible to detect minute losses of definition in the image beyond a certain limiting point. The screen can, as a matter of fact, be moved through considerable distances without appreciably changing the distinctness of the picture on the screen, and it can also be tipped to considerable angles without changing appreciably the distinctness of the picture.

There exists, therefore, a considerable region of space in which it is possible to get a practically distinct picture on the screen, and since throughout this region the appearance of the screen as regards distinctness of picture is not changed, it is appropriate for practical purposes to speak always of the image as if it were on the screen no matter what the position of the screen throughout the above mentioned region of space may be. This region of space surrounding the plane of best definition in which it is possible to get sufficiently distinct pictures on the screen regardless of the position of the screen in the region, or of its tip through moderate angles, will be called throughout this exposition "the image region", and the sufficiently sharp picture on the screen will simply be called "the image".

Although the image on the screen does not change appreciably in distinctness throughout the whole region even with moderate screen obliquity, the size and shape of the image on the screen does not remain the same as the screen is moved in the before mentioned ways. If the screen is perpendicular to the optical axis and is moved in the image region from a certain point to a point more remote from the lens, the image on the screen will become larger in the same proportion as the distance from the lens is increased, and if the screen is tipped in the image region about an axis perpendicular to the optical axis, the image on the screen will be distorted. The most noticeable characteristic of the distortion when the screen is oblique is the "keystone" effect mentioned at the beginning.

Just as there is an image region, as above described, surrounding the mathematical image in space, so there is a corresponding region surrounding the plane transparency in which it can be moved parallel to itself along the optical axis, or slightly tipped, without appreciably changing the distinctness of the image on the screen. Since, in distinction to the image, the plane transparency following the technical terms of optics, would be called the "object", I will call this region of space by analogy "the object space".

The magnitude of the object space is in general very much less than the magnitude of the image space, and since both of their limits are determined by the position at which the blurring of the image is noticeable it is clear that both spaces have very imperfectly defined boundaries.

The magnitude of the image space corresponds to what is known in optical technology as "depth of focus". My method of overcoming the distortion known as the keystone effect can now be put in general terms.

The beam of light in the object space bears stamped upon it the geometrical characteristics of the object. These characteristics become invisible during the passage of the light through the lens but they appear again in the image space and produce on any screen in the image space perpendicular to the optical axis, a magnified, geometrically similar image of the object. Our problem, therefore, is to modify or reconstruct the lens system in such a way that the image, defined by a screen perpendicular to the axis, is no longer geometrically similar to the object but is distorted in such a way that it contains within it what might be called an "inverse keystone effect", that is, the distortion of the image beam is such that the image produced on a screen perpendicular to the axis in the image region would be distorted in such a way as to show a keystone effect of an opposite kind to that which the unmodified lens system would produce on the oblique screen at the same point.

The distortion which we desire to produce in the image beam, said beam being tested by the image produced on a screen placed in the image region perpendicular to the optical axis, is of a peculiar and unique type. It may be briefly symbolized by saying that one set of equidistant parallel lines in the object remain equidistant and parallel in the image, while the set of equidistant parallel lines perpendicular to the first set in the object appear in the image on the screen not as parallel but as converging toward a distant point in the plane of the screen.

This type of geometrical distortion is substantially that which occurs on the exhibiting screens in common practice when the screen is not perpendicular to the light beam, and hence as before mentioned one distortion may be used to neutralize the other.

It should be noticed that these two distortions which thus neutralize each other are due to quite different causes, the one on the oblique screen being due to the fact that all parts of the screen are not equidistant from the projection lens, whereas the distortion of the image beam is the direct result of a unique type of refraction.

The simplest way to accomplish the distortion of the image beam before mentioned is by the substitution of a properly distorted virtual image for the object. For this purpose I have, among other methods, obtained good results by the use of an optical element in the shape of a cylindrical lens tipped in relation to the transparency as hereinafter indicated.

In the accompanying drawings which illustrate one embodiment of the invention in diagrammatic form,—

Figure 1:
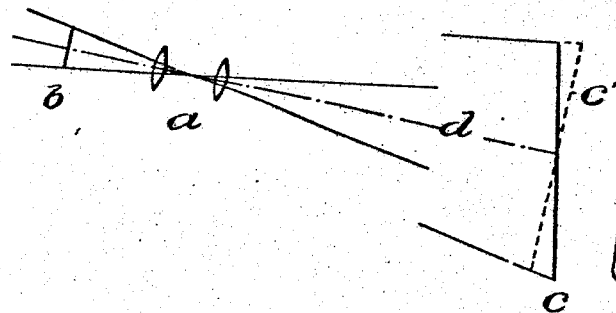
Figure 1 is a side elevation in diagram, partly broken away, showing the relation of projector and oblique screen in common use, which results in the distortion of the projected image above described.
Figure 2:
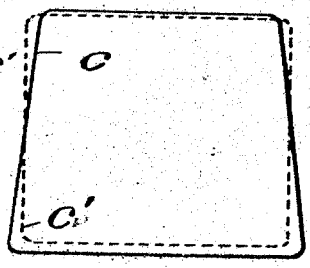
Fig. 2 is a face view in diagram of the keystone form of projected image caused by such distortion.
Figure 3:
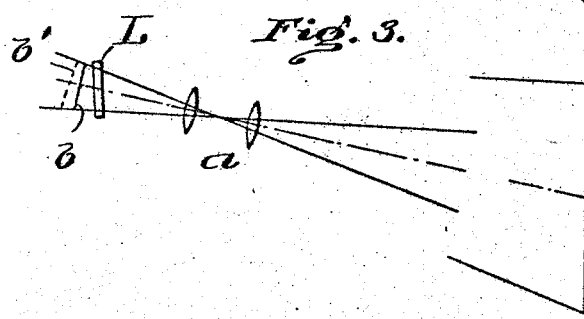
Fig. 3 is a side elevation similar to Fig. 1, showing in diagram a method of correcting such distortion.

Referring to Figs. 1 and 2, $a$ represents in conventional form the objective of an optical lantern, $b$ represents the transparency and $c$ represents the screen image. It will be noted that the central line $d$ of the light beam from the objective to the screen is not normal to the screen, consequently the projected image $c$ upon the screen will be in the shape of an inverted keystone as illustrated in Fig. 2, the lower part of the projected image $c$ being more remote from the optical lantern than the upper part, and therefore magnified to a greater extent. Since the transparency or object $b$ is normal to the central light beam $d$, the plane of the real image would also be normal to the central light beam $d$ as shown at $c'$. There will be a consequent loss of definition of the image $c$ on the screen owing to the fact that the screen image $c$ is not in the same plane as the plane of the real image $c'$.

In order to produce a distortion of the virtual image to counteract the distortion of the projected image on the screen, a refracting element, or elements, is introduced between the transparency and the screen, preferably near the transparency, capable of magnifying or reducing the virtual image in substantially one direction only, namely, in the direction of distortion of the screen image, which magnification or reduction, or both, are qualitatively and quantitatively suitable for neutralizing the distortion of the screen image.

The example of such refracting element illustrated in the drawings is a plano-convex cylindrical lens $L$, the axis of which is tipped relatively to the transparency, thus producing a distortion of the virtual image similar to but opposite to that of the screen image. Such virtual image is indicated diagrammatically at $b'$. The parts of the cylindrical lens $L$ nearest the object $b$ result in a certain magnification of the virtual image, depending on the distance of the lens from the object and on the focal length of the lens.

The parts of the lens $L$ at a greater distance from the object $b$ result in an increased magnification and in a removal of parts of the virtual image farther from the transparency. By suitably choosing the strength of the lens (focal length) and the tip or inclination of the lens to the transparency, any reasonable magnitude may be given to the progressive magnification of the virtual image. In other words, the distortion effect which is desired may be obtained to any desired degree.

Figure 6:
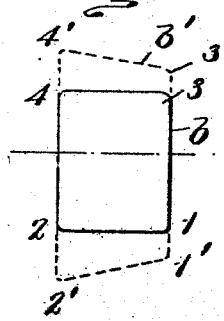
Fig. 6 is a face view of the object or transparency showing its relation to the virtual image.
Figure 5:
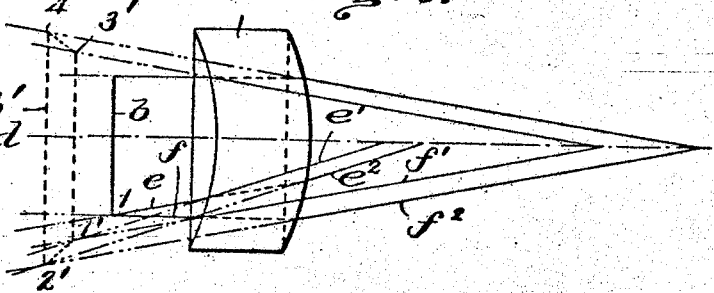
Fig. 5 is an illustrative diagram in plan view, showing one method of producing a distorted virtual image for counteracting the distortion of the projected image.

The relation of the object and virtual image are illustrated in Fig. 5, wherein the distance of the lens $L$ from the object $b$, also the inclination of the lens $L$, and also the distance between object and virtual image, are exaggerated for the purpose of clearness. Assume a beam of light passing through point 1 of the object $b$, of which one ray $e$ passes through lens $L$ and is refracted along the line $e'$, while another ray $f$ is refracted along the line $f'$. The virtual image of the point 1 will therefore appear at point $1'$ which is the intersection of the projection of the two lines $e'$ and $f'$. Similarly, beams passing through a point of the object $b$ immediately below the point 1 (indicated at 2 in Fig. 6) will pass through the lower part of the lens $L$ and along lines in the same vertical planes with $e$ and $f$ and be refracted along lines $e^2$ and $f^2$. The virtual image of the point 2, therefore, will be at the intersection of projections of the lines $e^2$ and $f^2$ shown at $2'$. The other corners 3 and 4 of the object $b$ in a similar manner produce virtual images $3'$ and $4'$.

Figure 4:
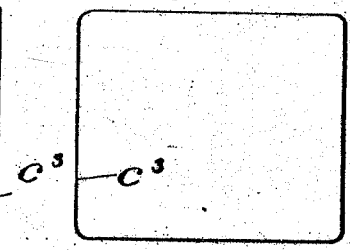
Fig. 4 is a face view similar to Fig. 2, showing the form of the corrected projected image.

The virtual image $b'$ is thus distorted and when projected upon the screen by a beam oblique to the screen appears as an undistorted image $c^3$ (Fig. 4) because the distortion of the virtual image $b'$ is equal and opposite to the distortion of the screen image due to the obliquity of the beam and therefore neutralizes it.

From the foregoing description it will be clear that not only may the keystone shape of the projected image be corrected, but also the vertical lengthening of the image on the screen which commonly results from the downward inclination or obliquity of the beam to the screen. The positive cylindrical lens magnifies the image in the direction perpendicular to the axis of the cylindrical lens as previously explained, and by suitably coördinating the curvature of the lens to the obliquity of the beam such lateral magnification may be used to offset the vertical elongation of the image due to the obliquity of the beam to the screen. Thus, the apparatus neutralizes both types of distortion due to the obliquity of the beam to the screen, namely, the keystone distortion and the elongation of the image more in the direction of one axis than the other.

The above described method and means for accomplishing the counteraction of the screen distortion is merely one exemplification of my invention; and it will be understood that other means may be used for producing the required distortion of the image beam than a tipped plano-convex cylindrical lens, the essential condition being that refracting means be employed to produce a distortion of the image beam of an opposite kind to the distortion of the projected image.

In order to obtain the best results by the use of my method with the tipped cylindrical lens, the rays entering the film should be as near parallel as possible, to avoid the well known astigmatic effect of a cylindrical lens, which would impair the definition of the virtual image if the rays deviated too far from parallelism.

The words "horizontal" and "vertical" as used throughout the specification and claims are to be understood to be used only in a relative sense, horizontal referring to the direction of the elements of the screen which are perpendicular to the optical axis (horizontal in Fig. 2) and vertical referring to the direction at right angles thereto, viz., the direction of the elements of the screen which have the greatest obliquity with respect to the optical axis. Likewise "top" and "bottom" refer to those portions of the system and of the beam corresponding to the portions of the screen which are farthest from and closest to the projector, respectively, due to the obliquity of the screen with respect to the optical axis.

I claim:

1. The method of producing on a screen which is oblique to the central ray of the light striking the screen, a magnified substantially undistorted image of the object, comprising projecting a beam of light from the object to the screen, and distorting the beam in such manner that an oblique section of the image beam in the image region is substantially geometrically similar to the object.

2. The method of producing on a screen which is oblique to the transparency, a magnified substantially undistorted image of the transparency, comprising projecting a beam of light from the object to the screen, and refracting the beam in such manner as to produce in a plane normal to the beam an image of varying angular magnification of such extent that the absolute magnification on the oblique screen is uniform.

3. The method of producing on a screen which is oblique to the transparency, a magnified substantially undisturbed image of the transparency, comprising projecting a beam of light from the object to the screen, and distorting the beam to produce a virtual image of the transparency distorted in a manner and to an extent proportional and opposite to the normal distortion of the projected image due to the obliquity of the screen.

4. The method of producing on a screen which is oblique to the central ray of the light striking the screen, a magnified image of the object which is substantially free from keystone distortion comprising projecting a beam of light from the object to the screen, and laterally refracting the beam in varying degree from top to bottom, whereby an oblique section of the image beam in the image region is laterally magnified uniformly.

5. The method of producing on a screen which is oblique to the transparency, a magnified image of the transparency, which is substantially free from keystone distortion, comprising projecting a beam of light from the object to the screen, and laterally refracting the beam in varying degree from top to bottom, thereby producing in a plane normal to the beam an image of varying lateral magnification of such extent that the lateral magnification on the oblique screen is uniform.

6. The method of producing on a screen which is oblique to the transparency, a magnified image of the transparency, which is substantially free from keystone distortion, comprising projecting a beam of light from the object to the screen, and laterally refracting the beam in varying degree from top to bottom, thereby producing a virtual image of the transparency laterally distorted in a manner and to an extent proportional and opposite to the lateral distortion of the projected image due to the obliquity of the screen.

7. Projection apparatus for producing on a screen which is oblique to the object, a magnified substantially undistorted image of the object, comprising means for projecting a beam of light from the object to the screen, and means for distorting the beam by refraction in such manner than an oblique section of the image beam in the image region is substantially geometrically similar to the object.

8. Projection apparatus for producing on a screen which is oblique to the transparency, a magnified substantially undistorted image of the transparency, comprising means for projecting a beam of light from the object to the screen, and refracting means tipped relatively to the transparency for distorting the beam in such manner as to produce in a plane normal thereto an image of varying angular magnification of such extent that the absolute magnification on the oblique screen is uniform.

9. Projection apparatus for producing on a screen which is oblique to the object, a magnified image of the object, which is substantially free from keystone distortion, comprising means for projecting a beam of light from the object to the screen, and means for laterally refracting the beam in varying degree from top to bottom, whereby an oblique section of the image beam in the image region is laterally magnified uniformly.

10. Projection apparatus for producing on a screen which is oblique to the transparency, a magnified image of the transparency, which is substantially free from keystone distortion, comprising means for projecting a beam of light from the object to the screen, and refracting means tipped relatively to the transparency for laterally refracting the beam in varying degree from top to bottom, thereby producing in a plane normal thereto an image of varying lateral magnification of such extent that the lateral magnification on the oblique screen is uniform.

11. Projection apparatus for producing on a screen which is oblique to the transparency, a magnified image of the transparency, which is substantially free from keystone distortion, comprising refracting means tipped relatively to the transparency for producing a virtual image of the transparency laterally distorted in a manner and to an extent proportional and opposite to the lateral distortion of the projected image due to the obliquity of the screen.

12. Projection apparatus for producing on a screen which is oblique to the central ray of the beam of light striking the screen, a magnified, substantially undistorted image of a transparency, comprising a cylindrical lens for refracting the rays of light passing from the object to the screen, the cylindrical lens being inclined with relation to the optical axis, whereby there is produced in a plane normal to the beam an image of varying angular magnification such that the absolute magnification on the oblique screen is uniform.

13. Projection apparatus for producing a magnified image of a transparency on a screen which is oblique to the central ray of the beam of light striking the screen, comprising a cylindrical lens tipped relatively to the transparency for refracting the rays of light passing from the object to the screen, whereby there is produced in a plane normal to the beam an image of varying lateral magnification such that the lateral magnification on the oblique screen is uniform.

14. Projection apparatus comprising means for holding the object to be projected and a lens in the path of the projected image having different powers in horizontal and vertical planes, respectively, and being tipped relatively to the plane of the object.

15. Projection apparatus having an optical axis and an object, a positive cylindrical lens, an objective lens, and a screen, the cylindrical lens and the screen being oblique to the optical axis.

16. Projection apparatus wherein the screen and the object are oblique to each other, comprising an objective lens, and a refracting element oblique to the optical axis for neutralizing keystone distortion.

17. Projection apparatus comprising an objective lens and a cylindrical lens in front of the objective lens and tipped relatively to the transparency.

18. Projection apparatus for producing, on a screen which is oblique to the object, a magnified image of the object which is substantially free from keystone distortion, comprising means for projecting a beam of light from the object to the screen, and light deflecting means for laterally deflecting the beam in varying degree from top to bottom so that an oblique section of the beam in the region of the screen is laterally magnified uniformly.

19. Projection apparatus for producing, on a screen which is oblique to the object, a magnified image of the object which is substantially free from keystone distortion, comprising means for projecting a beam of light from the object to the screen, and light deflecting means for laterally deflecting the beam in varying degree from top to bottom, the light deflecting means having an optical surface oblique to the optical axis.

20. Projection apparatus for producing, on a screen which is oblique to the object, a magnified image of the object which is substantially free from keystone distortion, comprising means for projecting a beam of light from the object to the screen, and light refracting means for laterally refracting the beam in varying degree from top to bottom, the light refracting means having an optical surface oblique to the optical axis.

Signed by me at Boston, Massachusetts, this 14th day of June, 1915.

DANIEL F. COMSTOCK.

Witnesses:
ROBERT CUSHMAN,
RICHARD W. HALL.